United States Patent
Oishi et al.

(10) Patent No.: US 9,436,891 B2
(45) Date of Patent: Sep. 6, 2016

(54) DISCRIMINATING SYNONYMOUS EXPRESSIONS USING IMAGES

(71) Applicant: GLOBALFOUNDRIES INC., Grand Cayman (KY)

(72) Inventors: Chiaki Oishi, Kanagawa (JP); Tetsuya Nasukawa, Tokyo (JP); Shoko Suzuki, Kanagawa-ken (JP)

(73) Assignee: GlobalFoundries, Inc., Grand Cayman (KY)

( * ) Notice: Subject to any disclaimer, the term of this patent is extended or adjusted under 35 U.S.C. 154(b) by 57 days.

(21) Appl. No.: 13/954,645

(22) Filed: Jul. 30, 2013

(65) Prior Publication Data

US 2015/0036930 A1 Feb. 5, 2015

(51) Int. Cl.

| | |
|---|---|
| G06K 9/00 | (2006.01) |
| G06K 9/62 | (2006.01) |
| G06F 17/27 | (2006.01) |
| G06K 9/72 | (2006.01) |
| G06K 9/46 | (2006.01) |

(52) U.S. Cl.
CPC ......... *G06K 9/6201* (2013.01); *G06F 17/2795* (2013.01); *G06K 9/6212* (2013.01); *G06K 9/72* (2013.01); *G06K 9/4671* (2013.01)

(58) Field of Classification Search
CPC ........................................................ G06K 9/00
USPC ........................................................ 382/118
See application file for complete search history.

(56) References Cited

U.S. PATENT DOCUMENTS

| | | | |
|---|---|---|---|
| 6,026,388 A | * | 2/2000 | Liddy et al. |
| 7,483,829 B2 | | 1/2009 | Murakami et al. |
| 8,463,794 B2 | | 6/2013 | Ikawa et al. |
| 2009/0319275 A1 | * | 12/2009 | Noda ..................... G10L 13/08 704/266 |
| 2010/0088295 A1 | * | 4/2010 | Duan et al. .................. 707/705 |
| 2011/0026779 A1 | * | 2/2011 | Matsumoto et al. ......... 382/118 |
| 2012/0158716 A1 | * | 6/2012 | Zwol ................ G06F 17/30265 707/728 |
| 2012/0232884 A1 | | 9/2012 | Nasukawa et al. |
| 2012/0290577 A1 | * | 11/2012 | Cai et al. ..................... 707/737 |

FOREIGN PATENT DOCUMENTS

| | | |
|---|---|---|
| JP | 07-028851 | 1/1995 |
| JP | 08-221430 | 8/1996 |
| JP | 10-289240 | 10/1998 |
| JP | 2000-276483 | 10/2000 |
| JP | 2003-044476 | 2/2003 |
| JP | 2008234175 A * | 10/2008 |
| JP | 2010-055298 | 3/2010 |

OTHER PUBLICATIONS

Andrade, D. et al. "Robust Measurement and Comparison of Context Similarity for Finding Translation Pairs" Proceedings of the 23rd International Conference on Computational Linguistics. Aug. 2010. pp. 19-27.

Murakami, A. et al. "Term Aggregation: Mining Synonymous Expressions Using Personal Stylistic Variations" 20th International Conference on Computational Linguistics, Proceedings of the Conference. Aug. 2004. (7 Pages).

Schuster, M., et al. "Japanese and Korean Voice Search" 2012 IEEE International Conference on Acoustics, Speech and Signal Processing. Mar. 2012. pp. 5149-5152.

* cited by examiner

Primary Examiner — Stephen R Koziol
Assistant Examiner — Delomia L Gilliard
(74) Attorney, Agent, or Firm — Hoffman Warnick LLC; Yuanmin Cai

(57) ABSTRACT

A method for identifying synonymous expressions includes determining synonymous expression candidates for a target expression. A plurality of target images related to the target expression and a plurality of candidate images related to each of the synonymous expression candidates are identified. Features extracted from the plurality of target images are compared with features extracted from the plurality of candidate images using a processor to identify a synonymous expression of the target expression.

20 Claims, 3 Drawing Sheets

DISCRIMINATING SYNONYMOUS EXPRESSIONS USING IMAGES

BACKGROUND

1. Technical Field

The present invention relates to natural language processing, and more particularly to identifying synonymous expressions of words by considering the similarities between images.

2. Description of the Related Art

The identification of synonymous expressions is one of the most important issues in natural language processing for handling textual data. For example, the expression "windshield" can also be expressed as "windscreen" in English, or as "parabrisas," "windschutzscheibe," etc. in other languages. The use of online dictionaries for identifying synonymous expressions is very limited as many expressions are used in a variety of different textual data contexts.

For various applications of natural language processing, including text mining, machine translation, and information retrieval, the identification of synonymous expressions is often important in improving the performance of applications. Because of this, a variety of techniques have been developed for extracting synonymous expressions. However, none of these current techniques are mature enough, and their accuracies are evaluated by checking whether the correct answer is contained within a list of top N candidate expressions rather than whether the answer is correct or not.

One of the limitations of the current techniques is that they only rely on textual information. For example, from a textual data set in the automotive domain, the expressions "door" and "mirror" may be extracted as synonymous expressions of "window" using the current approaches, as they share similar contexts such as "open" and "break."

SUMMARY

A method for identifying synonymous expressions includes determining synonymous expression candidates for a target expression. A plurality of target images related to the target expression and a plurality of candidate images related to each of the synonymous expression candidates are identified. Features extracted from the plurality of target images are compared with features extracted from the plurality of candidate images using a processor to identify a synonymous expression of the target expression.

A system for identifying synonymous expressions includes a candidate identification module configured to determine synonymous expression candidates for a target expression. An image selection module is configured to identify a plurality of target images related to the target expression and a plurality of candidate images related to each of the synonymous expression candidates. A comparison module is configured to compare features extracted from the plurality of target images with features extracted from the plurality of candidate images using a processor to identify a synonymous expression of the target expression.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
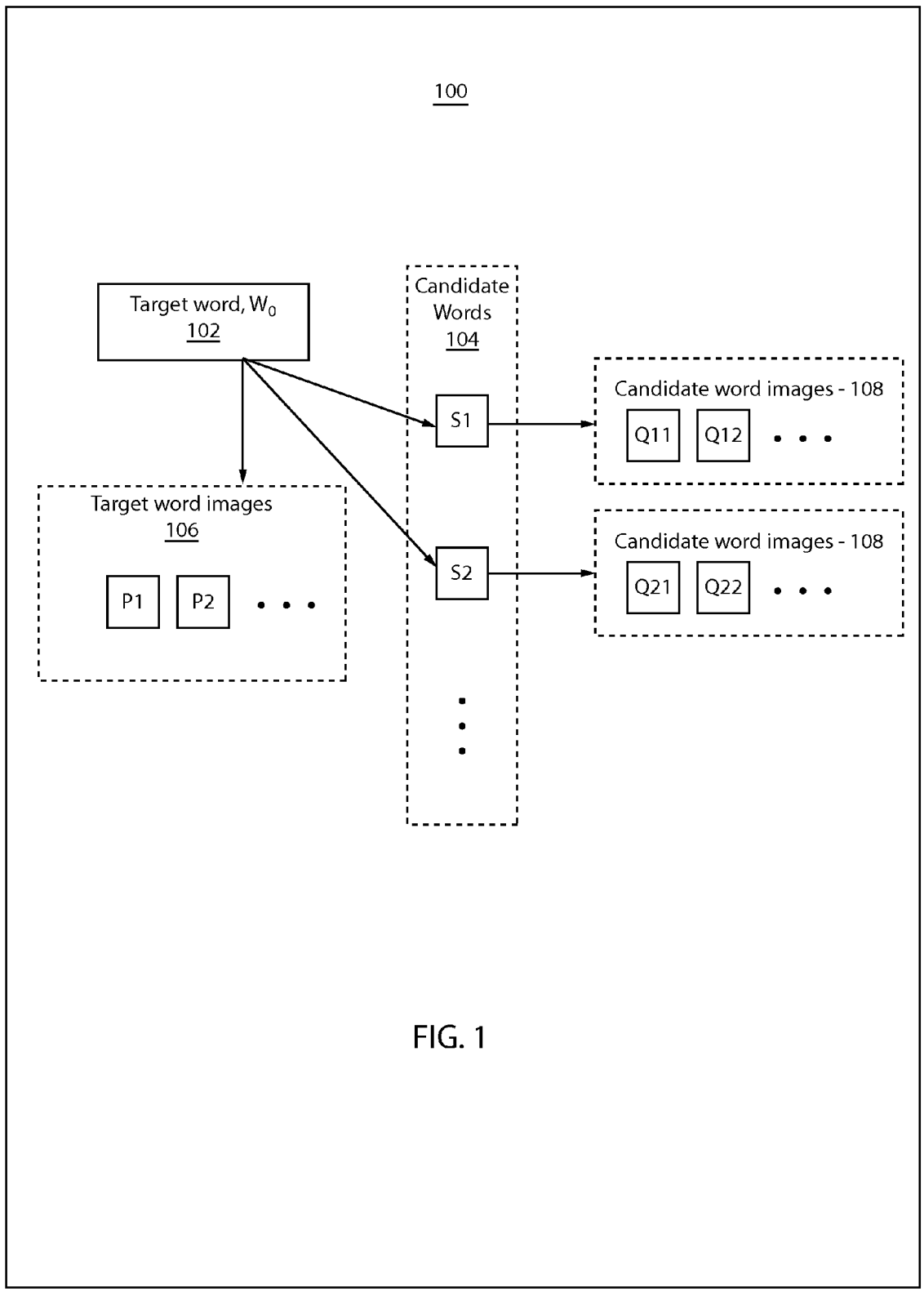
FIG. 1 is a high-level block/flow diagram showing a system/method for identifying synonymous expressions from a target expression, in accordance with one illustrative embodiment.

In accordance with the present principles, systems and methods for discriminating synonymous expressions using images are provided. The linkage of images and textual information has been developed to a practical level in recent years. The present invention identifies synonymous expressions of words by considering the similarities between the images that are related to the words.

For a given target expression, synonymous expression candidates are identified. A plurality of target images related to the target expression and a plurality of candidate images related to the synonymous expression candidates are selected. Features are extracted for the images, which may include using a plurality of feature extraction techniques. The features of the target images are compared with the features of the candidate images to identify a synonymous expression of the target expression. The present invention was found to have greater accuracy compared to current techniques.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and least one of", for example, in the cases of "A/B", "A and/or B" and "at least one of A B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a high-level block/flow diagram showing a system/method for identifying synonymous expressions 100 is shown in accordance with one illustrative embodiment. For a target word 102, denoted as $W_o$, candidates words 104 of synonymous expressions $\{S_j: j=1, \ldots, m\}$ are selected. For the target word $W_o$ and each candidate $S_j$, multiple related images $P_i$ and $Q_{jk}$, respectively, are selected. Features are extracted for each image and the features for target word images $P_i$ are compared with features for candidate word images $Q_{jk}$ to identify the image whose features are most similar to extract a synonymous expression for the target word $W_o$.

Figure 2:
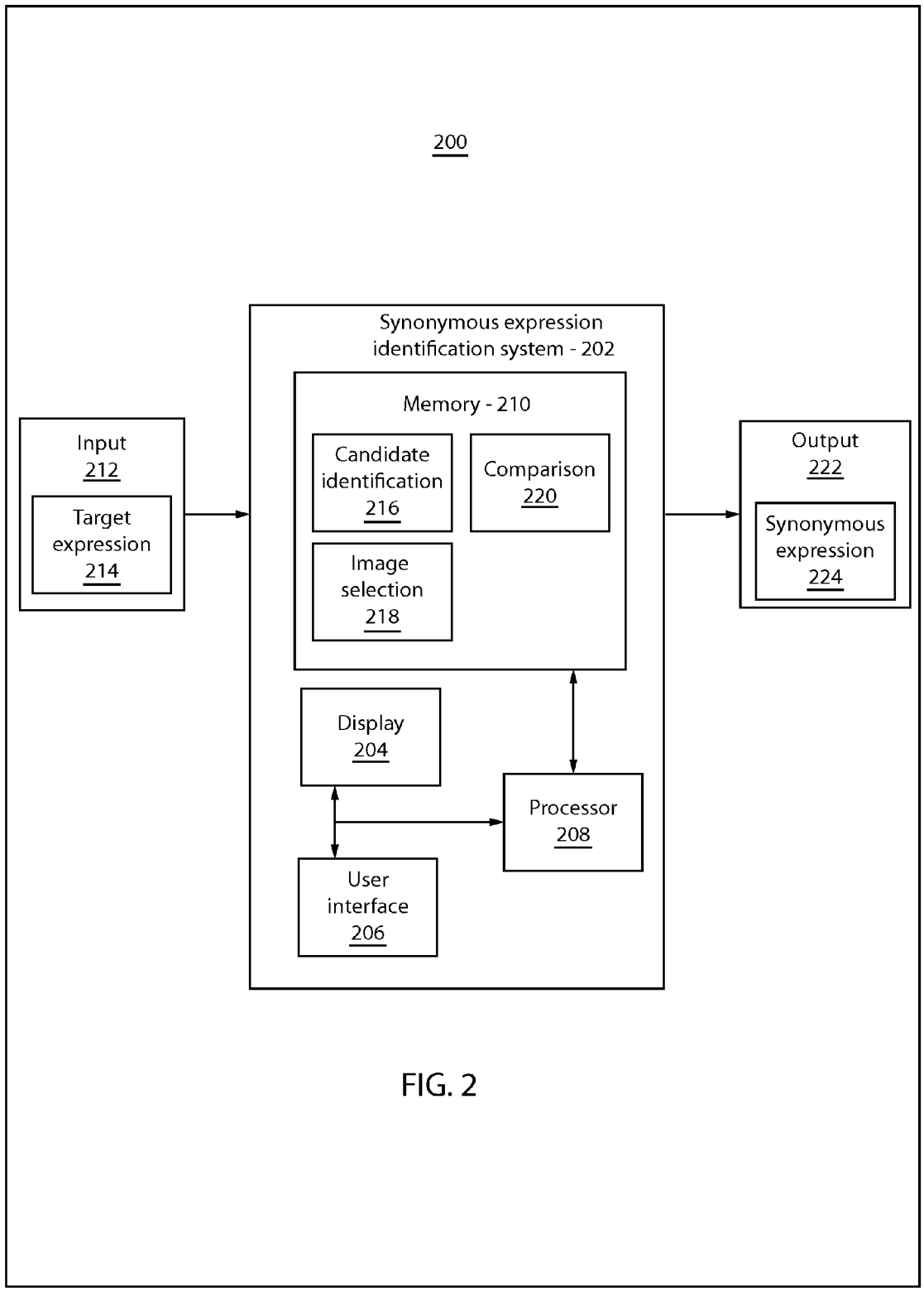
FIG. 2 is a block/flow diagram showing a system for identifying synonymous expressions, in accordance with one illustrative embodiments.

Referring now to FIG. 2, a block/flow diagram showing a system for identifying synonymous expressions 200 is shown in accordance with one illustrative embodiment. The system 200 identifies synonymous expressions of words by considering the similarities between the images that are related to the words.

It should be understood that embodiments of the present principles may be applied in a number of different applications. For example, the present invention may be discussed throughout this application as in terms of identifying synonymous expressions. However, it should be understood that the present invention is not so limited. Rather, embodiments of the present principles may be employed in any application to identify similar or related candidates for any target.

The system 200 may include a system or workstation 202. The system 202 preferably includes one or more processors 208 and memory 210 for storing data, applications, modules and other data. The system 202 may also include one or more displays 204 for viewing. The displays 204 may permit a user to interact with the system 202 and its components and functions. This may be further facilitated by a user interface 206, which may include a mouse, joystick, or any other peripheral or control to permit user interaction with the system 202 and/or its devices. It should be understood that the components and functions of the system 202 may be integrated into one or more systems or workstations, or may be part of a larger system or workstation.

The system 202 may receive input 212, which may include target expression 214. The target expression 214 may include one or more words, phrases, images, sounds, or other forms of expressions that synonymous expressions are to be identified for. The synonymous expressions may include one or more synonymous or similar words, phrases, images, sounds, etc., which may be in another language, format, or configuration.

The candidate identification module 216 is configured to identify candidates of synonymous expressions for the target expression 214. The candidates of synonymous expressions may be identified by known techniques. For example, see commonly assigned U.S. Pat. No. 7,483,829 entitled "Candidate synonym support device for generating candidate synonyms that can handle abbreviations, mispellings, and the like;" U.S. Pat. No. 8,463,794 entitled "Computer system, method, and computer program for extracting terms from document data including text segment;" and U.S. patent application Ser. No. 13/413,866 entitled "Method, program and system for finding correspondence between terms," all of which are incorporated herein by reference in their entirety. Other techniques may also be employed within the context of the present invention.

The image selection module 218 is configured to select a plurality of images that are related to the target expression and each candidate. Known search engines may be employed to select the plurality of images. For example, image meta search or content-based image retrieval (CBIR) techniques may be employed to select a plurality of images related to the target expression and candidate synonym expressions. Other techniques are also contemplated.

The comparison module 220 is configured to compare features extracted from the target expression images with the candidate expression images to determine synonymous expressions of the target expression. Features may be extracted from each of the selected plurality of images using known feature extraction techniques, such as, e.g., speeded up robust features (SURF), scale-invariant feature transform (SIFT), oriented BRIEF (ORB), etc. Other feature extractions techniques may also be employed. Preferably, multiple feature extraction techniques are employed to extract features from the plurality of images.

In some embodiments, color information may be useful as an image feature. For example, color information may be relevant where the target word is "fire." To incorporate color information as an image feature, the binary data (e.g., 10 bit) of the RGB color model is determined and expressed as a histogram of 1000 dimensions (i.e., 10×10×10).

Similarities are calculated for the target expression images. Outliers that are not similar to the other images are removed using outlier detection techniques. Outlier detection techniques may include, e.g., local outlier factor (LOF), student's t-test, etc. Other techniques may also be employed. A method for extracting features and calculating similarity is selected that is best fitted and results in the highest similarities among the remaining target expression images.

Using the selected feature extraction and similarity method, pair-wise similarities $s(l,j,k)$ are calculated between each image from the remaining target expression images and each candidate expression image. The similarities preferably include, e.g., cosine similarity, Jaccard similarity, etc. Calculating similarity may include extracting visual words by clustering all the keypoints from feature extraction of the candidate expression images, attach cluster IDs (i.e., visual words) for each keypoint in target expression images and candidate expression images, calculating a histogram of visual words for each image as a feature vector, and calculating cosine similarity of feature vectors for each pair of images (target expression image and candidate expression image).

In some embodiments, a distance measure may be better than the similarity measure. For example, a distance measure may be a better measure where the target expression is "injury." The distance measure may include, e.g., a Euclidean distance, Manhattan distance, etc. Other distance metrics may also be employed. The distance of each image is sorted in, e.g., ascending order, where each distance is calculated from the histogram of feature extraction.

The pair-wise similarities $s(l,j,k)$ are ranked, e.g., in descending order and the number of times each candidate synonymous expression appears above a threshold (i.e., the frequency) is determined. The candidate synonymous expression appearing most frequently above the threshold is determined as the synonymous expression 226 of the target image.

The synonymous expression 226 may be included as the output 224. The synonymous expression 226 may include one or more synonymous or similar words, phrases, images, sounds, etc., which may be in another language, format, or configuration.

Figure 3:
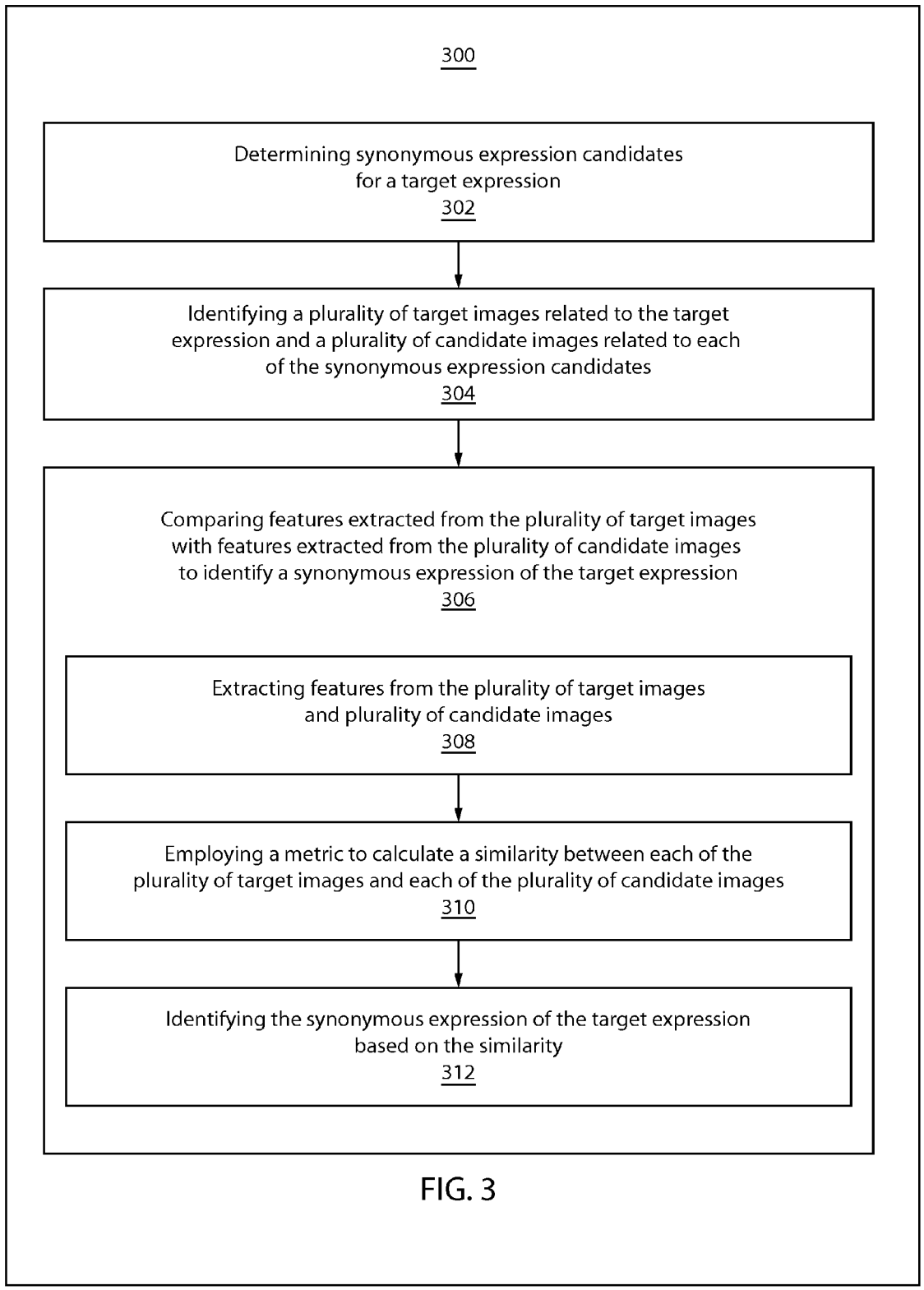
FIG. 3 is a block/flow diagram showing a method for identifying synonymous expressions, in accordance with one illustrative embodiment.

Referring now to FIG. 3, a block/flow diagram showing a method for synonymous expression identification 300 is depicted in accordance with one illustrative embodiment. In block 302, synonym expression candidates are determined for a target expression. The target expression many include expressions (e.g., words, phrases, images, sounds, etc.) for which a synonymous expression is to be determined. In block 304, a plurality of target images related to the target expression and a plurality of candidate images relates to each of the synonym expression candidates are identified. Identifying the images may include employing image meta search, CBIR, etc.

In block 306, features extracted from the plurality of target images are compared with features extracted from the plurality of candidate images to identify a synonymous expression of the target expression. This may include extracting features from the plurality of target images and plurality of candidate images in block 308. Feature extraction may employ, e.g., SURF, SIFT, ORB, etc. In some embodiment, extracting features may include extracting color information as an image feature.

In block 310, a metric is employed to calculate a similarity between each of the plurality of target images and each of the plurality of candidate images. Preferably, the metric includes a similarity metric, such as, e.g., cosine similarity, Jaccard similarity, etc. In one embodiment, the metric may also include a distance metric, such as, e.g., a Euclidean distance, Manhattan distance, etc. Other metrics may also be employed within the context of the present principles.

In some embodiments, outliers of the plurality of target images are eliminated before the similarity between each of the plurality of target images and each of the plurality of candidate images is calculated. This may include calculating similarities between target images and removing outliers using outlier detection techniques. In a preferred embodiment, a plurality of feature extraction methods and a plurality of metrics are employed and the feature extraction method and metric (e.g., similarity, distance) is selected that is best fitted and results in the highest similarity between the target expression images.

In block 312, the synonymous expression of the target expression is identified based on the similarity. The synonymous expression may include expressions (e.g., words, phrases, images, sounds, etc.) which are synonymous with the target expression. In one embodiment, identifying the synonymous expression may include sorting the synonymous expression candidates associated with the candidate images and identifying the most frequent synonymous expression candidate as the synonymous expression. A threshold may be employed to identify the most frequent synonymous expression candidates above a threshold as the synonymous expression. In another embodiment, identifying the synonymous expression may include identifying the top N synonymous expression candidates associated with candidate images having the top N highest similarity or distance. Other methods of identifying the synonymous expression based on the metric are also contemplated.

Having described preferred embodiments of a system and method for discriminating synonymous expressions using images (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for identifying synonymous expressions, comprising:
    determining synonymous expression candidates for a target non-facial-based expression;
    identifying a plurality of target images related to the target non-facial-based expression and a plurality of candidate images related to each of the synonymous expression candidates; and
    comparing features extracted from the plurality of target images with features extracted from the plurality of candidate images using a processor to identify a synonymous expression of the target non-facial-based expression,
    wherein the synonymous expression includes at least one of a word, a phrase, and a sound.

2. The method as recited in claim 1, wherein comparing includes employing a metric to compare features extracted from the plurality of target images with features extracted from the plurality of candidate images.

3. The method as recited in claim 2, wherein the metric includes at least one of a similarity metric and a distance metric.

4. The method as recited in claim 2, wherein comparing further comprises identifying the synonymous expression of the target non-facial-based expression based on the metric.

5. The method as recited in claim 4, wherein comparing further comprises ranking the images based on the metric and selecting a synonymous expression candidate associated with a most frequent candidate image as the synonymous expression.

6. The method as recited in claim 5, wherein selecting includes selecting the synonymous expression candidate associated with the most frequent candidate image above a threshold as the synonymous expression.

7. The method as recited in claim 1, wherein the features extracted from the plurality of target images and the features extracted from the plurality of candidate images includes color information.

8. The method as recited in claim 1, further comprising removing outliers from the plurality of target images.

9. A non-transitory computer readable storage medium comprising a computer readable program for identifying synonymous expressions, wherein the computer readable program when executed on a computer causes the computer to perform the steps of:
    determining synonymous expression candidates for a target non-facial-based expression;
    identifying a plurality of target images related to the target non-facial-based expression and a plurality of candidate images related to each of the synonymous expression candidates; and
    comparing features extracted from the plurality of target images with features extracted from the plurality of candidate images to identify a synonymous expression of the target non-facial-based expression,
    wherein the target non-facial-based expression and the synonymous expression include at least one of a word, a phrase, and a sound.

10. The non-transitory computer readable storage medium as recited in claim 9, wherein comparing includes employing a metric to compare features extracted from the plurality of target images with features extracted from the plurality of candidate images, the metric including at least one of a similarity metric and a distance metric.

11. The non-transitory computer readable storage medium as recited in claim 9, wherein the features extracted from the plurality of target images and the features extracted from the plurality of candidate images includes color information.

12. A system for identifying synonymous expressions, comprising:
    a candidate identifier determining synonymous expression candidates for a target non-facial-based expression;
    an image selector identifying a plurality of target images related to the target non-facial-based expression and a plurality of candidate images related to each of the synonymous expression candidates; and
    a comparator comparing features extracted from the plurality of target images with features extracted from the plurality of candidate images using a processor to identify a synonymous expression of the target non-facial-based expression,
    wherein the synonymous expression includes at least one of a word, a phrase, and a sound.

13. The system as recited in claim 12, wherein the comparator employs a metric to compare features extracted from the plurality of target images with features extracted from the plurality of candidate images.

14. The system as recited in claim 13, wherein the metric includes at least one of a similarity metric and a distance metric.

15. The system as recited in claim 13, wherein the comparator identifies the synonymous expression of the target non-facial-based expression based on the metric.

16. The system as recited in claim 15, wherein the comparator ranks the images based on the metric and select a synonymous expression candidate associated with a most frequent candidate image as the synonymous expression.

17. The system as recited in claim 16, wherein the comparator selects the synonymous expression candidate associated with the most frequent candidate image above a threshold as the synonymous expression.

18. The system as recited in claim 12, wherein the features extracted from the plurality of target images and the features extracted from the plurality of candidate images includes color information.

19. The system as recited in claim 12, wherein the comparator removes outliers from the plurality of target images.

20. The method as recited in claim 1, wherein the synonymous expression includes the sound.

* * * * *